Patented Aug. 27, 1940

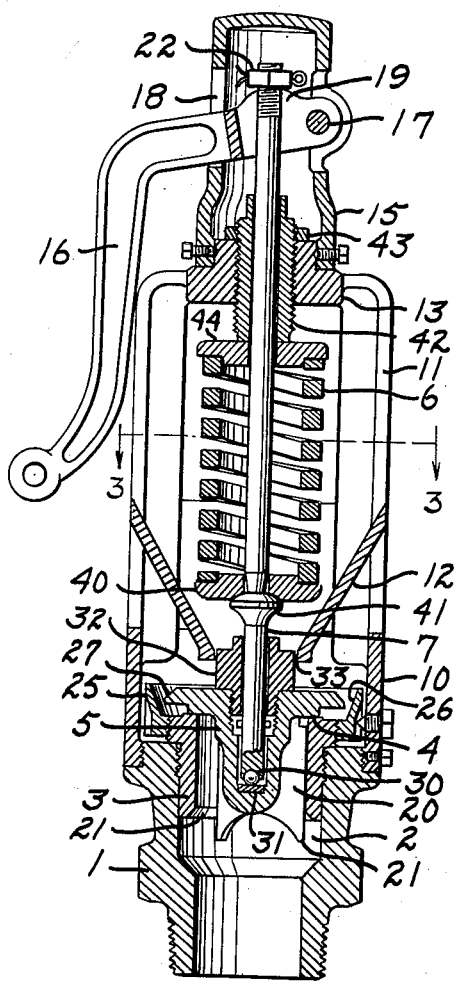
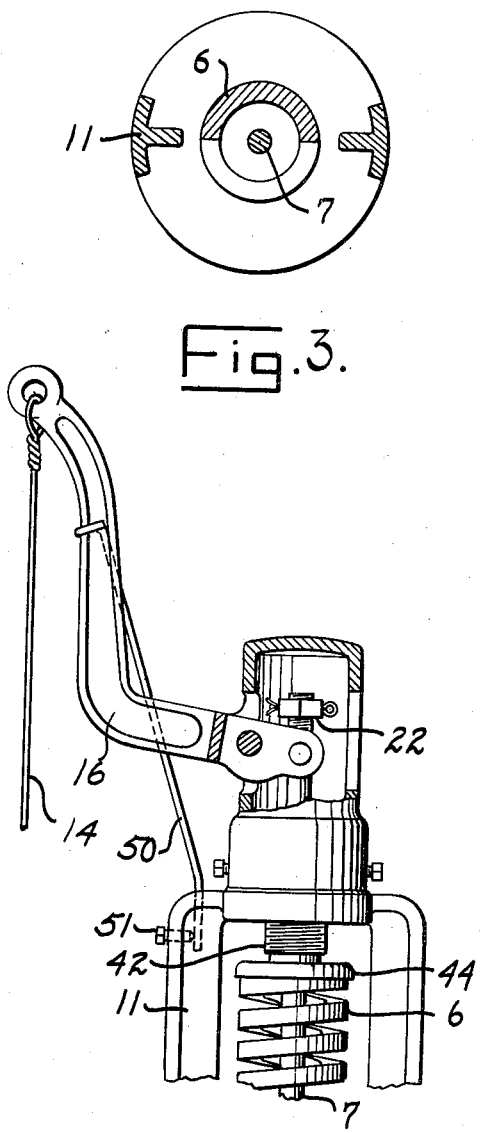

2,212,997

UNITED STATES PATENT OFFICE 2,212,997

SAFETY VALVE

Alva G. Blanchard and Ollie L. Mulloy, Shreveport, La.; said Mulloy assignor to said Blanchard Application September 11, 1939, Serial No. 294,296

5 Claims. (Cl. 137—53)

This invention relates to safety valves and particularly to valves of the pop-off type used for the release of gaseous fluids from within pressure vessels when such fluid exceeds a predetermined pressure.

The primary object of the invention is to provide a device of the class described which is accurate in operation and one which maintains such accuracy during long periods of use.

Another object is to provide a safety valve structure in which means is provided for protecting the closure spring and associated parts from the vapors released by the valve as well as the high temperatures of the vapors.

Still another object is to provide a safety valve in which the ratio of the effective valve opening to the valve displacement is controlled.

It is also an object to provide a safety valve of such construction that the escaping fluid is instrumental in effecting a pressure upon the valve to cooperate with the usual spring pressure and assist in closing the valve.

It is also an object to provide a safety valve which includes a manually operable lever for opening the valve at will, means being provided to counterbalance the lever so that automatic operation of the valve will not be affected thereby.

Still another object is to provide a device of the class described including a valve having guiding fins which are adapted to engage the seat ring and accurately guide the valve to and from its seat.

The foregoing objects together with others will be apparent from the following description considered in connection with the drawing in which:

Fig. 1 is a vertical sectional view thru a construction illustrating one embodiment of the invention;

Fig. 2 is a fragmentary view partly in section showing a modified construction in which the manually operable lever is counterbalanced;

Fig. 3 is a sectional view taken on line 3—3 in Fig. 1;

In the form selected for illustrating the invention the valve base 1 is adapted to be secured to a pressure vessel with which the device is used. This base has its internal bore enlarged at 2 to receive a seat ring 3 having an upwardly facing valve seat 4 upon which the valve 5 is positioned when the valve is closed. The valve is urged to closed position by means of the spring 6 bearing upon the upper end of the valve stem 7.

A valve cage generally referred to as 10 extends upwardly from the base 1 and includes ribs 11 to which a conical downwardly extending deflector is secured. A head 13 at the upper end of the ribs 11 serves to provide an adjustable abutment for the upper end of the spring 6. A bonnet 15 surmounts the head 13 to support the popping lever 16 so that the valve may be actuated manually if desired.

The bore of the seat ring 2 is of such diameter as to slidably receive guiding fins or wings 20 on the valve 5. These guiding fins are preferably equal to or greater in length than the diameter of the valve and are also of such length that the lower outer edges 21 thereof will not enter the bore of the seat ring above the chamfer 21 at the lower end thereof. By means of the construction just described the tendency of the valve to cant is minimized and it is also impossible for the lower edge 21 of the fins to enter the bore and gouge or otherwise wear the inner wall of the valve seat.

Attached to the periphery of the seat ring 3 at its upper end is an orifice control ring 25 which has an outwardly converging annular surface 26 adjacent which the valve 5 moves. There is therefore provided an annular opening between the valve and this ring, the cross section of such opening varying with the displacement of the valve from the seating surface 4. Hence the effective orifice or opening of the valve is dependent upon the position of the valve member 5 axially of the control ring 25.

The valve member 5 is chamfered peripherally at 27 to provide a surface against which the escaping fluid impinges as it leaves the annular orifice between the valve member and the ring 25. In this manner a downward force is produced upon the valve member 5, such force assisting the valve 6 in returning the valve to its seat when the pressure of the actuating fluid has fallen a predetermined amount.

The valve stem 7 fits within an opening axially of the valve 5 and has a ball 30 fitting within its lower end and abutting a wear resistant insert 31. This stem is held in place by means of a bushing 32 of such dimension as to fit closely within the opening 33 at the lower end of the deflector 12. By means of this construction the deflector serves not only to deflect the escaping gases outwardly but also as a stop which determines the uppermost limit of travel of the valve which, as already explained, is such that the lower edges 21 of the wings 20 do not enter within the seat rings 3.

Pressure is applied directly to the valve stem 7 by means of a collar 40 engaging the lower end of the spring 6 and an enlargement 41 on the valve stem. The amount of pressure exerted by the spring 6 is determined by the adjustment of the bushing 42 threadedly mounted in the head 13 and secured in adjusted position therein by means of a locked nut 43. The lower end of the bushing 42 engages collar 44 which bears upon the upper end of the spring 6.

The valve stem 7 extends upwardly thru the bushing 42 into the bonnet 15 and thence thru an opening in the lever 16 pivoted at 17 to the bonnet. This lever passes thru a slot 18 in the opposite side of the bonnet and has an upwardly projecting surface 19 which is engageable with the stop nut 22. It is believed apparent that by means of this construction the lever 16 may be manually actuated to lift the valve 5 or to assist in lifting such valve from its seat. At the same time the construction is such that the weight of the lever 16 has no effect upon the operation of the valve.

The construction just described is such that the lever 16 may be mounted in the manner shown in Fig. 2 whereby a downward pull upon such lever is more effective than it is when the lever is as illustrated in Fig. 1. In this modification, however, there is a constant tendency for the weight of the lever and associated pull cord 14 to exert an upward pressure against the stop nut 22 and hence to modify the force actually exerted upon the valve stem to hold the valve in closed position. In order to obviate this tendency there is provided a leaf spring 50 which enters an opening in one of the ribs 11 and is secured in place therein by means of a set screw 51. The upper end of the spring 50 is of such configuration as to engage the arm 16 and hold such arm upwardly against the force of gravity so that the opposite end of the arm will not engage the stop nut 22 unless an actuating pull is effected upon the cord 14.

The advantages and operation of the construction as above described are believed apparent. By way of summary it will be pointed out that the valve 5 is held upon its seat by the spring 6 until sufficient pressure is generated within the container to which the device is attached to lift the valve from its seat. The distance of travel of the valve will depend upon the pressure exerted by the spring 6 as well as the rate at which pressure is being generated within the container. Likewise the rate of discharge of such fluid will depend upon the distance of travel of the valve since the orificed opening is determined by an annular space between the valve and the surface 26 of the orifice control ring 25.

Likewise the limit of travel is determined by the lower end of the deflector 12 and is such that the lower edges of the wings 21 will not enter the bore within the seat ring 3. As the actuating pressure is reduced the spring 6 together with the downward force exerted by the pressure fluid upon the surface 27 will cause the valve to close and in this manner the desired functioning of the device is accomplished.

It is apparent that if desired the valve may be manually operated by means of a pull exerted upon the lever 16 as illustrated in either of Figs. 1 and 2.

Broadly the invention comprehends an improved construction of safety valve which is accurate in its operation and which is so constructed as to maintain such accuracy throughout a long period of use.

We claim:

1. A top outlet safety valve including a valve base, a valve seat therein, a valve on said seat, a cage extending upwardly from said base, a spring in said cage yieldingly urging the valve against its seat, and a conical steam deflector integral with the upstanding portions of the cage and having its lower end loosely surrounding the valve stem.

2. A top outlet safety valve including a valve base, a valve seat therein, a valve on said seat, a stem on said valve, a cage extending upwardly from said base, means within said cage for yieldingly urging the valve against the seat, and a conical steam deflector integral with said cage surrounding the valve stem adjacent the valve and extending upwardly and outwardly within the cage to deflect fluid away from said means.

3. In a top outlet safety valve the combination of an upwardly opening valve having a stem thereon, a spring yieldingly urging the valve against its seat, a cage surrounding said spring, said cage having upwardly extending ribs so that escaping fluid may pass outwardly of the cage, and an inverted conical deflector supported by the ribs and interposed between the valve and spring.

4. In a top outlet safety valve the combination of an upwardly opening valve having a stem thereon, a spring yieldingly urging the valve against its seat, a cage surrounding said spring, said cage having upwardly extending ribs so that escaping fluid may pass outwardly of the cage, and an inverted conical deflector supported by the ribs and interposed between the valve and spring, the lower end of said deflector loosely surrounding the valve stem and serving as a stop to limit the upward travel of the valve.

5. A top outlet safety valve including, a valve base, an upwardly facing valve seat therein, an adjusting ring surrounding said seat, a valve on said seat, a spring yieldingly urging the valve against said seat, an annular outwardly tapering wall surrounding and above said valve, and an annular chamfer on the valve, the lower edge of which is below the top of the adjusting ring when the valve is closed and approximately flush or higher when the valve is open to provide a surface for contact with escaping fluid whereby the force exerted thereon by the fluid aids the spring in closing the valve with a quick action.

ALVA G. BLANCHARD.
OLLIE L. MULLOY.